(12) United States Patent
Van Valkenburgh

(10) Patent No.: US 9,045,184 B2
(45) Date of Patent: Jun. 2, 2015

(54) REVERSIBLE MOTORCYCLE STAND

(71) Applicant: Pit Bull Products, Inc., Huntsville, AL (US)

(72) Inventor: Charles Van Valkenburgh, Huntsville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 77 days.

(21) Appl. No.: 14/056,067

(22) Filed: Oct. 17, 2013

(65) Prior Publication Data

US 2015/0108323 A1    Apr. 23, 2015

(51) Int. Cl.
*F16M 11/00*    (2006.01)
*B62H 3/10*    (2006.01)
*F16M 11/16*    (2006.01)

(52) U.S. Cl.
CPC . *B62H 3/10* (2013.01); *F16M 11/16* (2013.01)

(58) Field of Classification Search
CPC ............ B66F 15/00; B66F 3/005; B66F 5/00; B62H 1/12; B62H 3/00; B62H 3/10; F16M 11/16
USPC ................... 248/127, 129, 130, 131; 254/131
See application file for complete search history.

(56) References Cited

U.S. PATENT DOCUMENTS

| | | | | |
|---|---|---|---|---|
| 563,819 | A * | 7/1896 | Timms | 280/293 |
| 4,420,164 | A * | 12/1983 | Mitchell | 280/293 |
| 4,638,880 | A * | 1/1987 | Togashi | 180/219 |
| 7,000,901 | B1 * | 2/2006 | VanValkenburgh | 254/131 |
| 7,100,928 | B1 * | 9/2006 | VanValkenburgh | 280/164.1 |
| 2002/0117459 | A1 * | 8/2002 | Chen | 211/20 |
| 2004/0099851 | A1 * | 5/2004 | Carnahan | 254/131 |
| 2006/0163543 | A1 * | 7/2006 | Kobacker et al. | 254/131 |
| 2007/0252119 | A1 * | 11/2007 | Kobacker et al. | 254/131 |
| 2008/0023415 | A1 * | 1/2008 | Zuckerman | 211/20 |
| 2009/0250564 | A1 * | 10/2009 | Glover | 248/125.3 |
| 2011/0042918 | A1 * | 2/2011 | Tsai | 280/301 |
| 2012/0097810 | A1 * | 4/2012 | Burnett | 248/176.1 |
| 2013/0200316 | A1 * | 8/2013 | VanValkenburgh | 254/131 |

* cited by examiner

*Primary Examiner* — Mark Wendell
(74) *Attorney, Agent, or Firm* — Adam K. Sacharoff; Much Shelist

(57) ABSTRACT

A removable handle for a motorcycle stand that can be removed/replaced to face forward or rearward and on left or right side of motorcycle. When installed the handle is indexed at a precise angle to provide the correct angle for lifting the motorcycle. The handle is capable of being removed easily by removal of a single screw and when installed it is held tight by virtue of the mating male/female members that contain a star-shaped key section, a tapered/conical section and a cylindrical section. When the handle is removed from the motorcycle stand it is compact for shipping and/or storage.

7 Claims, 4 Drawing Sheets

REVERSIBLE MOTORCYCLE STAND

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates generally to motorcycle stands.

More particularly, this invention pertains to a method of removing and replacing a handle from a motorcycle stand for the purposes of a) allowing the motorcycle stand to be reconfigured from the handle facing forward position to the handle facing rearward position, and b) allowing the motorcycle stand to be broken down in size for shipping and/or storage. The invention locks the handle in-place on the motorcycle stand securely to withstand rotational and linear forces yet can be easily removed and replaced by the user.

Rear motorcycle stands are a popular way of raising the rear of a motorcycle off the ground for maintenance. A rear motorcycle stand normally raises the rear of the motorcycle high enough off the ground for maintenance including rear wheel removal while keeping the motorcycle oriented vertically as viewed from the front or rear. Most rear motorcycle stands consist of a main chassis with an upright structural member on each side and a handle protruding from the center of the main chassis to apply leverage to lift the motorcycle. Some motorcycle stands, however, are actuated by a handle situated on the side rather than the center. Side-mounted handles are desirable for lifting bikes with single-sided swing arms. An advantage to side-mounted handles is that they can be oriented forward with respect to the motorcycle allowing the user to hold the motorcycle's hand grip to stabilize the bike while lifting it.

Removable handles have previously been incorporated in conventional rear stands. Prior art removable handles generally have been used for leveraging the motorcycle upward but have not been used as a structural element after the motorcycle is elevated.

The present invention is composed of a male and female mating member, one incorporated into the main chassis of the motorcycle stand and one incorporated into the handle. A single fastener (screw) holds the two pieces together. De-mating the handle from the main chassis of the stand allows the user to change the orientation into one of the four configurations: 1) left side facing forward, 2) left side facing rearward, 3) right side facing forward, or 4) right side facing rearward.

Mating male and female locking members such as hex, oval, square or star shape prevent the two mating members from rotating with respect to each other. Mating tapered (conical) surfaces are also used to interlock the male and female laterally and rotationally. A screw is used to apply lateral force to keep the male and female members mated. The invention allows the handle to be used for leverage and then serve as a structural member without allowing lateral or rotational movement.

BRIEF SUMMARY OF THE INVENTION

The present invention is a removable handle for a motorcycle stand that allows rearward or forward orientation and serves as an integral, structural part of the motorcycle stand when in place. Installing the handle on the stand involves mating the male and female members in either the forward or rearward orientation then inserting the screw. Torsion force is then exerted to the screw to a) ensure the male and female mating members stay mated, and b) to exert lateral force on male and female tapered members to tighten the fit. To de-mate the handle from the stand, the user simply loosens a screw and the handle can pull away from the chassis of the stand.

Depending on dimensional relations of motorcycle and stand, the present invention allows the handle to be used forward or rearward and on left or right sides. When the handle is de-mated from the stand, it forms a compact package that is useful for storage and shipping.

BRIEF DESCRIPTION OF THE DRAWINGS

A fuller understanding of the foregoing may be had by reference to the accompanying drawings, wherein.

DETAILED DESCRIPTION OF THE INVENTION

Figure 1:
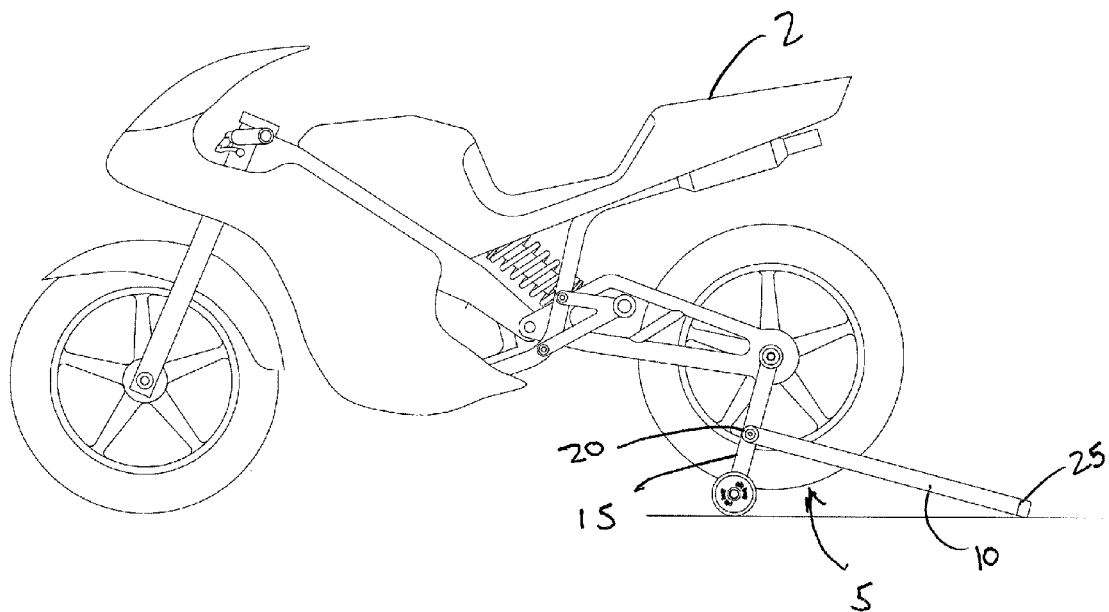
FIG. 1 illustrates a motorcycle on a stand with handle on left side oriented rearward.
Figure 2:
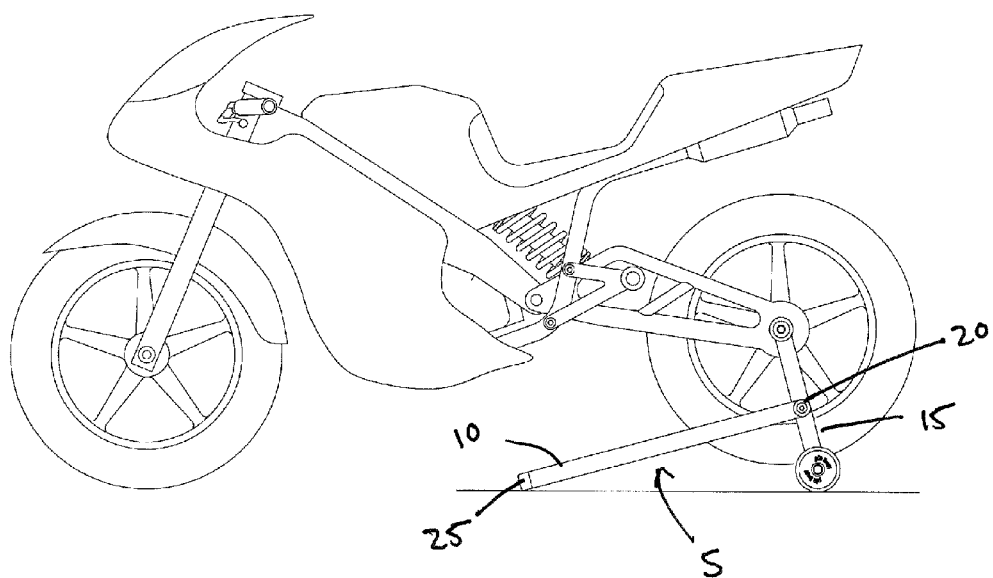
FIG. 2 illustrates a motorcycle on a stand with handle on left side oriented forward.
Figure 3:
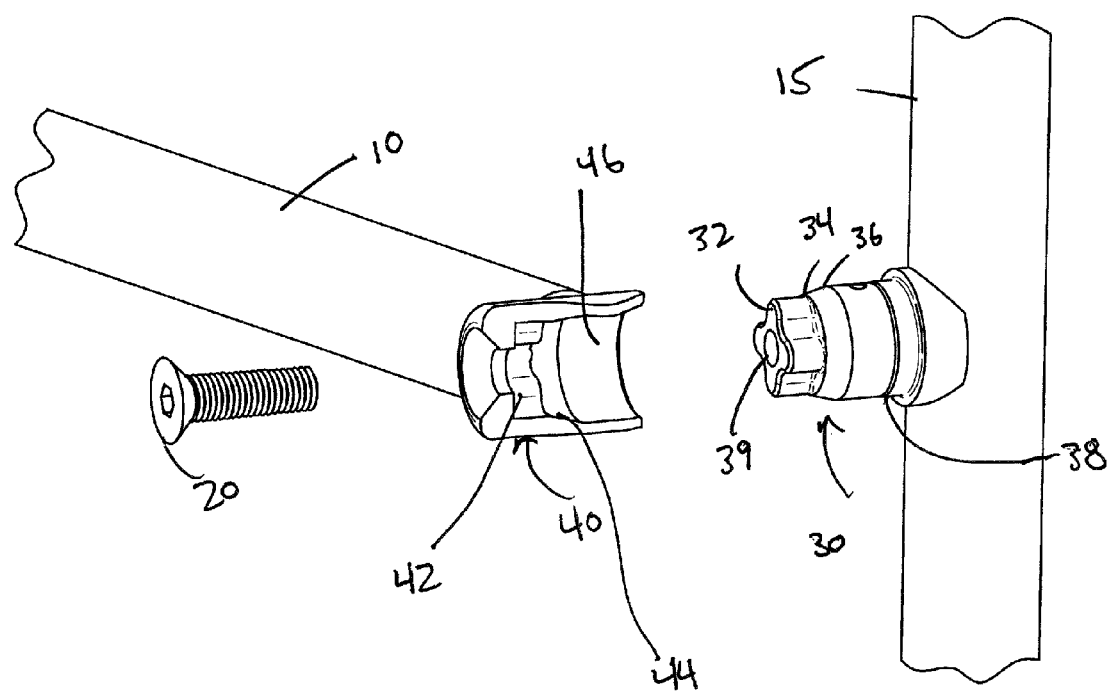
FIG. 3 illustrates the detail of male and female mating members.
Figure 4:
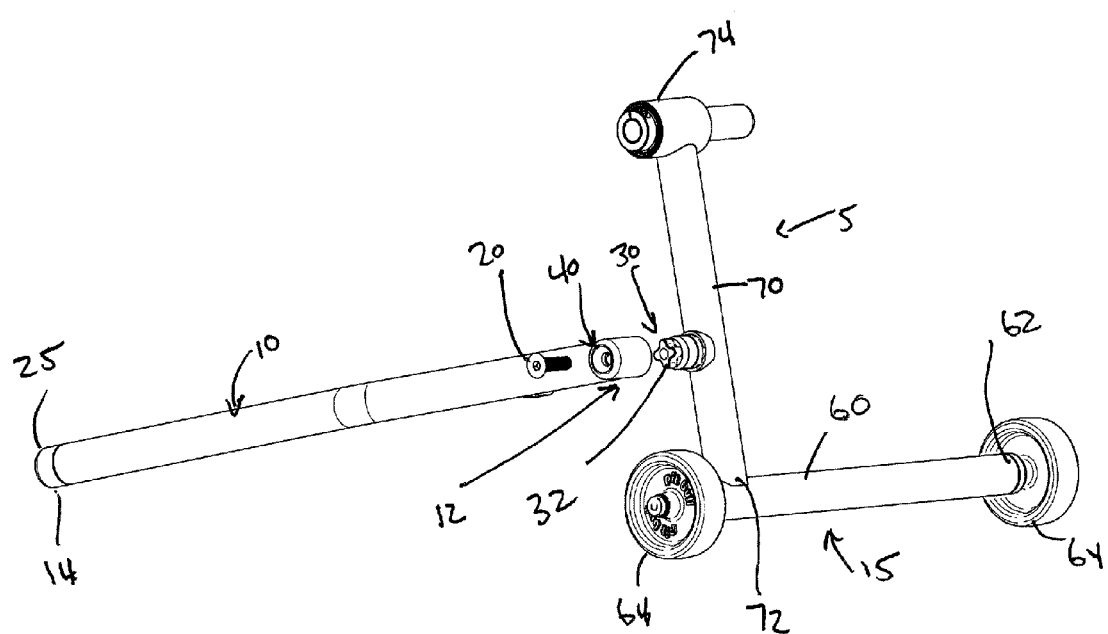
FIG. 4 illustrates the stand in an exploded view.
Figure 5:
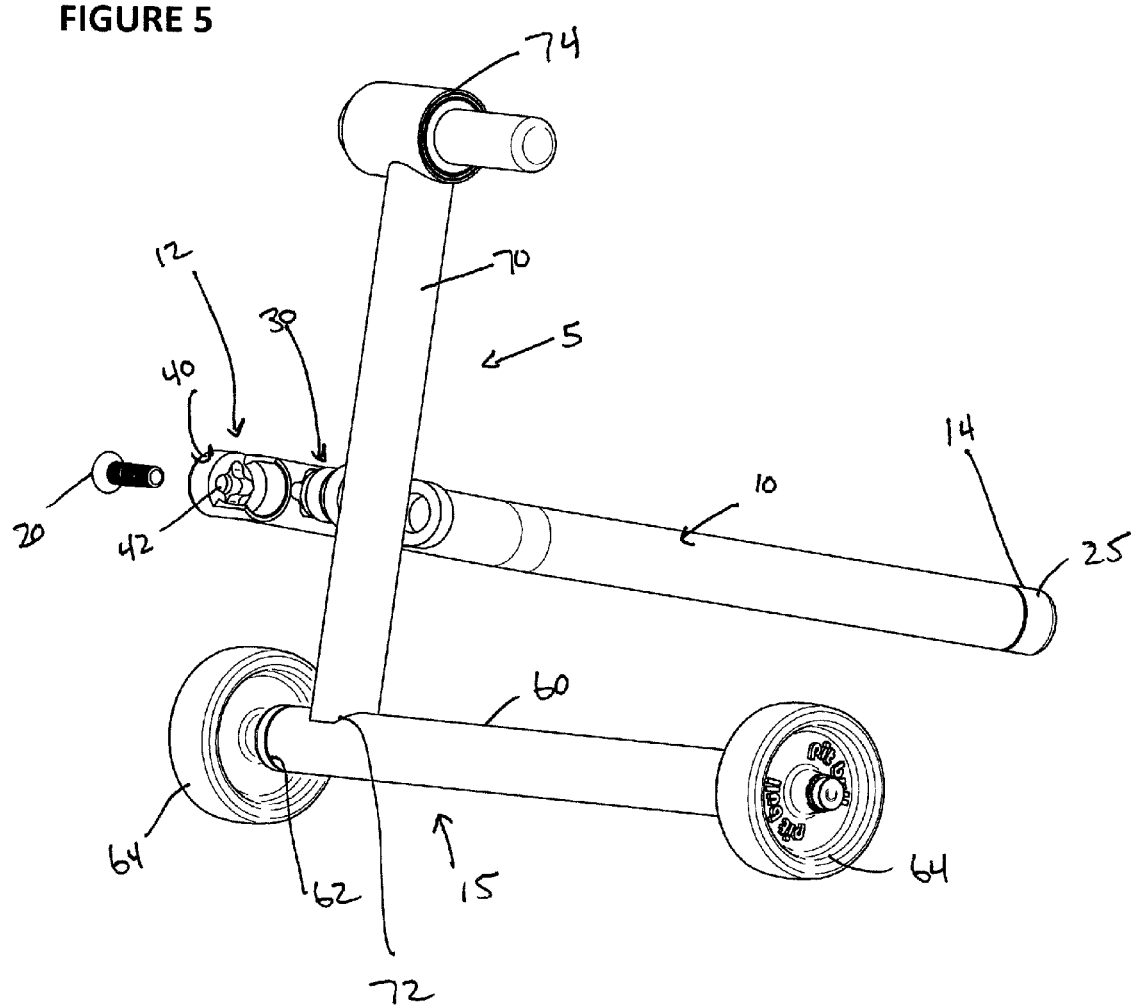
FIG. 5 illustrates the stand in an exploded view with a partial cut away on the mating member.

Referring now to FIGS. 1-5, there is shown a motorcycle stand 5 attached to a motorcycle 2. The present invention includes a handle component 10 of a rear motorcycle stand 5 that is removable/replaceable and capable of re-orientation. With the handle 10 removed, the stand component 15 is compact for shipping and/or storage. When the handle 10 is installed on the stand component 15 it is held with a simple mechanical fastener 20 such as a screw and it becomes a laterally and rotationally rigid structural part of the stand. The handle 10 can be removed from the stand component 15 easily by loosening and removing the screw 20.

The handle 10 can be oriented forward or rearward with respect to the stand to suit user preferences. With the handle 10 oriented forward the user can leverage the stand to lift the motorcycle 2 by holding the hand grip 25. In the forward orientation the stand does not extend behind the motorcycle. Therefore there is no trip-hazard behind the motorcycle and it is able to fit into a more compact space. With the handle 10 oriented rearward the user holds the seat or tail section of the motorcycle 2 while leveraging the stand to lift the motorcycle. In the rearward orientation the stand operator can lift the motorcycle with a rider seated on the motorcycle.

The key to the remove-ability/replace-ability is a male member 30 on the chassis of the stand and a female member 40 on the handle 10 of the stand. The male and female members mate to make a solid connection. The male member 30 consists of a star-shaped key 32 on its outward tip 34, then a tapered mid-section 36 and a cylindrical base section 38. The male member also includes a threaded bore 39 through its center for acceptance of a screw 20 that is inserted through the female member 40 that is part of the handle 10. The female member 40 has the following corresponding features: a star-shaped cutout 42 in its deepest portion, a tapered mid-section 44 and a cylindrical outermost section 46, and a bore 48 to receive the screw 20.

The removable handle is applicable to rear stands that accommodate single-sided swing arms as well as dual-sided swing arms. It is also applicable to front stands and stands that lift from the mid-section of the motorcycle.

In one embodiment there is provided a motorcycle stand 5. The stand 5 has a lateral support 60 with two ends 62. Each end 62 has attached thereto a rotatable wheel 64. An upright tube 70 is provided with having one end 72 secured to and extending from the lateral support 60, and another end 74 configured to be attached to a wheel on the motorcycle. The stand 5 further includes a handle 10 having one end 12 removably secured to the upright tube 70 and having another free end 14 distal to the upright tube. Wherein when the stand 5 is secured to a motorcycle moving the free end 14 lifts or lowers the motorcycle. Lastly, a means for securing and removably attaching the handle 10 to the upright tube 70 in a first position defined as having the free end 14 of the handle behind the motorcycle wheel and in a second position defined as having the free end 14 of the handle in front of the motorcycle wheel.

In an aspect of this embodiment, the means for securing and removably attaching the handle 10 to the upright tube 70 includes a male key 30 extending from one of the handle or upright tube and a female mating key aperture 40 positioned on the upright tube or handle and for receiving the male key. And wherein the male key and female key aperture has two key positions such that the handle can be attached to the upright tube in at least a first position and a second position.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims

What is claimed is:

1. A motorcycle stand comprising:
    a lateral support having two ends, each end having attached thereto a rotatable wheel;
    an upright tube having one end secured to and extending from the lateral support, and the upright tube having another end configured to be attached to a wheel on the motorcycle;
    a handle having one end removably secured to the upright tube and the handle having another free end distal to the upright tube, wherein when the stand is secured to a motorcycle moving the free end lifts or lowers the motorcycle; and
    a means for removably attaching the handle to the upright tube in a first position defined as having the free end of the handle behind the motorcycle wheel and in a second position defined as having the free end of the handle in front of the motorcycle wheel, and
    wherein the means for removably attaching the handle to the upright tube includes a male key extending from one of the handle or upright tube and a female mating key aperture positioned on the upright tube or handle and for receiving the male key and wherein the male key and female key aperture has two key positions such that the handle is configured to attach to the upright tube in at least the first and second positions.

2. The stand of claim 1, wherein the upright tube is secured to the lateral support adjacent one of the ends of the lateral support.

3. A motorcycle stand comprising:
    a lateral support having two ends, each end having attached thereto a rotatable wheel;
    an upright tube having one end secured to and extending from the lateral support, and the upright tube having another end configured to be attached to a wheel on the motorcycle;
    a handle having one end removably secured to the upright tube and the handle having another free end distal to the upright tube, wherein when the stand is secured to a motorcycle the free end lifts or lowers the motorcycle; and
    a means for removably attaching the handle to the upright tube in a first position defined as having the free end of the handle behind the motorcycle wheel and in second position defined as having the free end of the handle in front of the motorcycle wheel, and wherein the upright tube includes a male key defined to have a star-shaped key on an outward tip, the male key further having a tapered mid-section and a cylindrical base section, and wherein the handle includes a female key defined to have a star-shaped cutout, a tapered mid-section and a cylindrical section corresponding to receive the male key.

4. The stand of claim 3, wherein male and female keys include a bore for receiving a fastener to secure the handle to the upright tube when attached.

5. A motorcycle stand comprising:
    a lateral support having two ends, each end having attached thereto a rotatable wheel;
    an upright tube having one end secured to and extending from the lateral support, and the upright tube having another end configured to be attached to a wheel on the motorcycle;
    a handle having one end removably secured to the upright tube and the handle having another free end distal to the upright tube, wherein when the stand is secured to a motorcycle moving the free end lifts or lowers the motorcycle; and
    a male/female key configured to allow the handle to removably attach to the upright tube in a first position defined as having the free end of the handle behind the motorcycle wheel and in a second position defined as having the free end of the handle in front of the motorcycle wheel, and wherein the male/female key further is defined to include a male key section defined on the upright tube and having a star-shaped key on an outward tip, the male key further having a tapered mid-section and a cylindrical base section, and a female key section defined on the handle and having a star-shaped cutout, a tapered mid-section and a cylindrical section corresponding to receive the male key.

6. The stand of claim 5, wherein male and female keys include a bore for receiving a fastener to secure the handle to the upright tube when attached.

7. The stand of claim 5, wherein the upright tube is secured to the lateral support adjacent one of the ends of the lateral support.

* * * * *